(12) United States Patent
Ishikawa et al.

(10) Patent No.: US 9,045,586 B2
(45) Date of Patent: Jun. 2, 2015

(54) CONTINUOUS PRODUCTION METHOD FOR POLYCARBONATE-POLYORGANOSILOXANE COPOLYMER

(71) Applicant: IDEMITSU KOSAN CO., LTD., Chiyoda-ku (JP)

(72) Inventors: Yasuhiro Ishikawa, Chiba (JP); Hiroaki Motegi, Chiba (JP); Yukiko Nagao, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/362,375

(22) PCT Filed: Nov. 16, 2012

(86) PCT No.: PCT/JP2012/079854
§ 371 (c)(1),
(2) Date: Jun. 2, 2014

(87) PCT Pub. No.: WO2013/080816
PCT Pub. Date: Jun. 6, 2013

(65) Prior Publication Data
US 2014/0296469 A1    Oct. 2, 2014

(30) Foreign Application Priority Data
Dec. 2, 2011    (JP) .................................. 2011-265163

(51) Int. Cl.
| C08F 283/02 | (2006.01) |
| C08G 64/06 | (2006.01) |
| C08G 64/28 | (2006.01) |
| C08G 77/448 | (2006.01) |
| C08G 64/18 | (2006.01) |
| C08G 64/24 | (2006.01) |

(52) U.S. Cl.
CPC ................ *C08G 64/06* (2013.01); *C08G 64/28* (2013.01); *C08G 77/448* (2013.01); *C08G 64/186* (2013.01); *C08G 64/24* (2013.01)

(58) Field of Classification Search
CPC ....... C08G 77/448; C08G 4/186; C08G 64/28
USPC ....................................................... 525/464
See application file for complete search history.

(56) References Cited

U.S. PATENT DOCUMENTS

2009/0215977 A1    8/2009 Ooms et al.

FOREIGN PATENT DOCUMENTS

| JP | 06-100684 | 4/1994 |
| JP | 06-329781 | 11/1994 |
| JP | 2005 060599 | * 3/2005 |
| JP | 2008-101054 | 5/2008 |
| JP | 2009-132756 | 6/2009 |
| JP | 2009-235391 | 10/2009 |
| JP | 2009-249547 | 10/2009 |
| JP | 2009-285533 | 12/2009 |

OTHER PUBLICATIONS

JP 2005 060599 machine translation (2005).*
U.S. Appl. No. 14/362,335, filed Jun. 2, 2014, Ishikawa, et al.
U.S. Appl. No. 14/352,889, filed Apr. 18, 2014, Ishikawa, et al.
International Search Report issued Feb. 19, 2013, in PCT/JP12/079854, filed Nov. 16, 2012.

* cited by examiner

*Primary Examiner* — Kuo-Liang Peng
(74) *Attorney, Agent, or Firm* — Oblon, McClelland, Maier & Neustadt, L.L.P.

(57) ABSTRACT

The present invention provides a method for producing a polycarbonate-polyorganosiloxane copolymer economically and stably, in particular, the present invention is concerned with a method for continuous production of a polycarbonate-polyorganosiloxane copolymer including (A) a step of withdrawing a polymerization reaction solution obtained by polymerizing a dihydric phenol compound, a carbonate precursor, and a polyorganosiloxane in the presence of an alkaline compound aqueous solution and a water-insoluble organic solvent continuously or intermittently from a reactor; (B) a step of separating the polymerization reaction solution withdrawn in the step (A) into an aqueous phase and a water-insoluble organic solvent phase; and (C) a step of after washing the water-insoluble organic solvent phase separated in the step (B) with an acidic aqueous solution, separating the resultant into an aqueous phase and a water-insoluble organic solvent phase, wherein the aqueous phase separated in the step (C) is extracted with a water-insoluble organic solvent, the content of the polycarbonate-polyorganosiloxane copolymer in the obtained extract is controlled to not more than 2% by mass, and a part or the whole of the extract is reused for the step (A).

5 Claims, 1 Drawing Sheet

CONTINUOUS PRODUCTION METHOD FOR POLYCARBONATE-POLYORGANOSILOXANE COPOLYMER

TECHNICAL FIELD

The present invention relates to a method for continuous production of a polycarbonate-polyorganosiloxane copolymer.

BACKGROUND ART

A polycarbonate-based resin is a polymer excellent in transparency, heat resistance, and impact resistance and is widely used at present as an engineering plastic in the industrial field.

As a method for production of this polycarbonate-based resin, a method in which an aromatic dihydroxy compound such as bisphenol A, and phosgene are allowed to react directly with each other (interfacial polymerization method) is known as a method for producing a high-quality polycarbonate.

As the industrial production method of a polycarbonate by the interfacial condensation polymerization method, a method in which phosgene is bubbled into an alkali aqueous solution of a bisphenol to form a polycarbonate oligomer having a reactive chloroformate group, and a condensation reaction (polymerization reaction) of the polycarbonate oligomer and the bisphenol is further allowed to proceed in the presence of a polymerization catalyst such as a tertiary amine and an alkali aqueous solution simultaneously with or successively after the formation of the polycarbonate oligomer is adopted. From the viewpoints of solubility, handling properties, and the like, methylene chloride is mainly used as the water-insoluble organic solvent on an industrial scale.

The methylene chloride used in the reaction step is generally recovered and then reused for the reaction step (see Patent Document 1). In addition, the waste water after the polymerization reaction, the waste water formed after a washing step, and the waste water formed after a granulation step contain an inorganic material such as sodium chloride and an organic material such as a phenol and a polycarbonate. In order to remove such organic material from the aqueous phase and clean the waste water, the organic material is extracted and removed from the waste water by using an organic solvent, preferably the same water-insoluble organic solvent as that used in the polycarbonate production step, such as methylene chloride. The water-insoluble organic solvent containing the extracted and removed phenols and polymer is reused for the polymerization reaction step (see Patent Document 2).

It should be noted that among polycarbonate resins, a polycarbonate-polyorganosiloxane polymer (hereinafter sometimes referred to as "PC-POS") has been attracting attention because of its high impact resistance, high chemical resistance, and high flame retardancy, and the polymer has been expected to find utilization in a wide variety of fields such as the field of electrical and electronic equipment and the field of an automobile. As a method for production of PC-POS, a method in which a dihydric phenol compound and phosgene are allowed to react with each other to produce a polycarbonate oligomer, and the polycarbonate oligomer is polymerized with a polyorganosiloxane in the presence of methylene chloride, an alkaline compound aqueous solution, a dihydric phenol compound, and a polymerization catalyst is known (see Patent Document 3).

CITATION LIST

Patent Document

[Patent Document 1] JP 2009-132756-A
[Patent Document 2] JP 2009-285533-A
[Patent Document 3] JP 6-329781-A

SUMMARY OF INVENTION

Technical Problem

Even in the case of producing PC-POS, similar to the conventional general production of a polycarbonate resin, the method in which an organic material (the dihydric phenol compound and PC-POS) is extracted and removed from the waste water by using the same water-insoluble organic solvent as that used in the polycarbonate production process, such as methylene chloride, and then the methylene chloride which contains the dihydric phenol compound and PC-POS is reused is preferable from the economical and environmental viewpoints.

However, according to the investigations made by the present inventors, it has been found that in the case of producing PC-POS, a phenomenon in which the PC-POS concentration in the recovered methylene chloride becomes high tends to be caused, which is not caused in the general production of a polycarbonate resin. In the case where it is intended to reuse the water-insoluble organic solvent having a high PC-POS concentration for reaction step, it is difficult to stably produce PC-POS because of the generation of bubbling within a devolatilization column for removal of carbon dioxide in the water-insoluble organic solvent, or the generation of cavitation in a rotating machine connected with the column, such as a pump and a reactor.

Then, a problem of the present invention is to provide a method for producing a polycarbonate-polyorganosiloxane copolymer economically and stably.

Solution to Problem

As a result of extensive and intensive investigations made by the present inventors, it has been found that by controlling the concentration of polycarbonate-polyorganosiloxane copolymer in the methylene chloride to be reused to a fixed value or less, the above-described bubbling within a devolatilization column or the above-described generation of cavitation in a rotating machine such as a pump and a reactor is not caused, whereby the polycarbonate-polyorganosiloxane copolymer may be stably produced.

That is, the present invention relates to the following items [1] to [5].

[1] A method for continuous production of a polycarbonate-polyorganosiloxane copolymer comprising the steps of:

(A) withdrawing a polymerization reaction solution obtained by polymerizing a dihydric phenol compound represented by the following general formula (1), a carbonate precursor, and a polyorganosiloxane represented by the following general formula (2) in the presence of an alkaline compound aqueous solution and a water-insoluble organic solvent continuously or intermittently from a reactor;

(B) separating the polymerization reaction solution withdrawn in the step (A) into an aqueous phase and a water-insoluble organic solvent phase; and (C) after washing the water-insoluble organic solvent phase separated in the step (B) with an acidic aqueous solu- tion, separating the resultant into an aqueous phase and a water-insoluble organic solvent phase, wherein the aqueous phase separated in the step (C) is extracted with a water-insoluble organic solvent, the content of the polycarbonate-polyorganosiloxane copolymer in the obtained extract is controlled to not more than 2% by mass, and a part or the whole of the extract is reused for the step (A):

(1)

in the formula, each of $R^1$ and $R^2$ independently represents a halogen atom, an alkyl group having from 1 to 6 carbon atoms, or an alkoxy group having from 1 to 6 carbon atoms; X represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, —S—, —SO—, —SO$_2$—, —O—, or —CO—; and each of a and b independently represents an integer of from 0 to 4, (2)

in the formula, each of $R^3$ to $R^6$ independently represents a hydrogen atom, a halogen atom, an alkyl group having from 1 to 6 carbon atoms, an alkoxy group having from 1 to 6 carbon atoms, or an aryl group having from 6 to 12 carbon atoms; Y represents a single bond, or an organic residue containing an aliphatic or aromatic moiety; n is a an average repeating number; Z represents a halogen atom, —$R^7$OH, —$R^7$—$Z'$—$R^8$—OH, —$R^7$COOH, —$R^7$NH$_2$, —COOH, or —SH; $R^7$ represents a substituted or unsubstituted alkylene group, a substituted or unsubstituted cycloalkylene group, or a substituted or unsubstituted arylene group; $R^8$ represents an arylene group having from 6 to 12 ring-forming carbon atoms; Z' represents an alkylene group having from 1 to 8 carbon atoms, an alkylidene group having from 2 to 8 carbon atoms, a cycloalkylene group having from 5 to 10 carbon atoms, or a cycloalkylidene group having from 5 to 10 carbon atoms; and m is 0 or 1.

[2] The method for continuous production of a polycarbonate-polyorganosiloxane copolymer according to the item [1], wherein in the step (B), the separated water-insoluble organic solvent phase is further washed with an alkali aqueous solution and then separated into an aqueous phase and a water-insoluble organic solvent phase.

[3] The method for continuous production of a polycarbonate-polyorganosiloxane copolymer according to the item [1] or [2], wherein in the step (C), the separated water-insoluble organic solvent phase is further washed with water and then separated into an aqueous phase and a water-insoluble organic solvent phase; the aqueous phase separated in the step (C) is extracted with a water-insoluble organic solvent; the content of the polycarbonate-polyorganosiloxane copolymer in the obtained extract is controlled to not more than 2% by mass; and a part or the whole of the extract is reused for the step (A).

[4] The method for continuous production of a polycarbonate-polyorganosiloxane copolymer according to any one of the items [1] to [3], wherein in the step (C), a washing temperature is controlled to not higher than 37° C.

[5] The method for continuous production of a polycarbonate-polyorganosiloxane copolymer according to any one of the items [1] to [4], wherein the step (A) comprises the following step (a-1) and step (a-2); a reaction mixed solution obtained in the step (a-1) is separated into an aqueous phase and a water-insoluble organic solvent phase; the obtained aqueous phase is mixed with the aqueous phase obtained by washing with an acidic aqueous solution and separating in the step (C); the obtained aqueous phase is extracted with a water-insoluble organic solvent; the content of the polycarbonate-polyorganosiloxane copolymer in the obtained extract is controlled to not more than 2% by mass; and the extract is reused for the step (A):

Step (a-1): a step of allowing a dihydric phenol compound represented by the general formula (1) and a carbonate precursor to react with each other in the presence of an alkaline compound aqueous solution and a water-insoluble organic solvent to produce a polycarbonate oligomer having a repeating unit represented by the following general formula (I); and Step (a-2): a step of withdrawing a polymerization reaction solution obtained by polymerizing the dihydric phenol compound, the polycarbonate oligomer obtained in the step (a-1), and a polyorganosiloxane represented by the general formula (2) in the presence of an alkaline compound aqueous solution and a water-insoluble organic solvent continuously or intermittently from a reactor:

(I)

in the formula, $R^1$, $R^2$, X, a, and b are the same as defined above.

Advantageous Effects of Invention

According to the present invention, the generation of bubbling within a devolatilization column for removal of carbon dioxide in a water-insoluble organic solvent or the generation of a cavity in a rotating machine connected with the column, such as a pump and a reactor can be suppressed, and a method for producing a polycarbonate-polyorganosiloxane copolymer economically and stably can be provided.

DESCRIPTION OF EMBODIMENTS

The present invention is concerned with a method for continuous production of a polycarbonate-polyorganosiloxane copolymer comprising the steps of:

(A) withdrawing a polymerization reaction solution obtained by polymerizing a dihydric phenol compound rep- resented by the following general formula (1), a carbonate precursor, and a polyorganosiloxane represented by the following general formula (2) in the presence of an alkaline compound aqueous solution and a water-insoluble organic solvent continuously or intermittently from a reactor;

(B) separating the polymerization reaction solution withdrawn in the step (A) into an aqueous phase and a water-insoluble organic solvent phase; and (C) after washing the water-insoluble organic solvent phase separated in the step (B) with an acidic aqueous solution, separating the resultant into an aqueous phase and a water-insoluble organic solvent phase, wherein the aqueous phase separated in the step (C) is extracted with a water-insoluble organic solvent, the content of the polycarbonate-polyorganosiloxane copolymer in the obtained extract is controlled to not more than 2% by mass, and a part or the whole of the extract is reused for the step (A).

(1)

In the formula, each of $R^1$ and $R^2$ independently represents a halogen atom, an alkyl group having from 1 to 6 carbon atoms, or an alkoxy group having from 1 to 6 carbon atoms; X represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, —S—, —SO—, —SO$_2$—, —O—, or —CO—; and each of a and b independently represents an integer of from 0 to 4.

(2)

In the formula, each of $R^3$ to $R^6$ independently represents a hydrogen atom, a halogen atom, an alkyl group having from 1 to 6 carbon atoms, an alkoxy group having from 1 to 6 carbon atoms, or an aryl group having from 6 to 12 carbon atoms; Y represents a single bond, or an organic residue containing an aliphatic or aromatic moiety; n is a an average repeating number; Z represents a halogen atom, —R$^7$OH, —R$^7$—Z'—R$^8$—OH, —R$^7$COOH, —R$^7$NH$_2$, —COOH, or —SH; R$^7$ represents a substituted or unsubstituted alkylene group, a substituted or unsubstituted cycloalkylene group, or a substituted or unsubstituted arylene group; R$^8$ represents an arylene group having from 6 to 12 ring-forming carbon atoms; Z' represents an alkylene group having from 1 to 8 carbon atoms, an alkylidene group having from 2 to 8 carbon atoms, a cycloalkylene group having from 5 to 10 carbon atoms, or a cycloalkylidene group having from 5 to 10 carbon atoms; and m is 0 or 1.

In the general formula (1), examples of the halogen atom which each of R' and $R^2$ independently represents include a fluorine atom, a chlorine atom, a bromine atom, and an iodine atom.

Examples of the alkyl group which each of $R^1$ and $R^2$ independently represents include a methyl group, an ethyl group, an n-propyl group, an isopropyl group, various butyl groups (the term "various" means that a linear group and any branched groups are included; hereinafter the same), various pentyl groups, and various hexyl groups. Examples of the alkoxy group which each of $R^1$ and $R^2$ independently represents include alkoxy groups in which the alkyl group moiety thereof is the alkyl group described above.

Examples of the alkylene group represented by X include a methylene group, an ethylene group, a trimethylene group, a tetramethylene group, and a hexamethylene group, and above all, an alkylene group having from 1 to 5 carbon atoms is preferable. Examples of the alkylidene group represented by X include an ethylidene group and an isopropylidene group. Examples of the cycloalkylene group represented by X include a cyclopentanediyl group, a cyclohexanediyl group and a cyclooctanediyl group, and above all, a cycloalkylene group having from 5 to 10 carbon atoms is preferable. Examples of the cycloalkylidene group represented by X include a cyclohexylidene group, a 3,5,5-trimethylcyclohexylidene group and a 2-adamantylidene group, and above all, a cycloalkylidene group having from 5 to 10 carbon atoms is preferable, and a cycloalkylidene group having from 5 to 8 carbon atoms is more preferable.

Each of a and b independently represents an integer of from 0 to 4, preferably from 0 to 2, and more preferably 0 or 1.

In the general formula (2), examples of the halogen atom which each of $R^3$ to $R^6$ independently represents include a fluorine atom, a chlorine atom, a bromine atom, and an iodine atom. Example of the alkyl group and the alkoxy group which each of $R^3$ to $R^6$ independently represents include the same groups as those in the case of $R^1$ and $R^2$. Examples of the aryl group which each of $R^3$ to $R^6$ independently represents include a phenyl group and a naphthyl group.

Examples of the organic residue containing an aliphatic group moiety represented by Y include alkylene groups having from 1 to 10 carbon atoms (preferably from 1 to 6 carbon atoms, and more preferably from 1 to 3 carbon atoms). In addition, examples of the organic residue containing an aromatic group moiety represented by Y include arylene groups having from 6 to 12 ring-forming carbon atoms, such as a phenylene group, a naphthylene group and a biphenyldiyl group.

In the general formula (2), examples of the halogen atom represented by Z include a fluorine atom, a chlorine atom, a bromine atom, and an iodine atom. Among them, a chlorine atom is preferable.

Examples of the alkylene group represented by $R^7$ in —R$^7$OH, —R$^7$—Z'—R$^8$—OH, —R$^7$COOH, and —R$^7$NH$_2$ which Z represents include alkylene groups having from 1 to 10 (preferably from 1 to 5) carbon atoms, such as a methylene group, an ethylene group, a propylene group, a trimethylene group and a pentamethylene group. In addition, examples of the cycloalkylene group represented by R$^7$ include cycloalkylene groups having from 3 to 10 (preferably 4 to 8) ring-forming carbon atoms, such as a cyclopentylene group and a cyclohexylene group. Examples of the arylene group represented by R$^7$ include arylene groups having from 6 to 12 ring-forming carbon atoms, such as a phenylene group, a naphthylene group and a biphenyldiyl group.

R$^7$ may be substituted with an alkyl group having from 1 to 5 carbon atoms, an alkoxy group having from 1 to 5 carbon atoms, an aryl group having from 6 to 12 ring-forming carbon atoms, or the like. Examples of the alkyl group include a methyl group, an ethyl group, a propyl group and various butyl groups. Examples of the alkoxy group include alkoxy groups in which the alkyl group moiety thereof is the alkyl group described above. Examples of the aryl group include a phenyl group.

Examples of the alkylene group, the alkylidene group, the cycloalkylene group, and the cycloalkylidene group represented by Z' include the same groups as those in the case of X. Z' is preferably an alkylidene group having from 2 to 8 carbon atoms, and more preferably an isopropylidene group.

Here, examples of the dihydric phenol compound represented by the general formula (1) include bis(hydroxyaryl) alkanes such as 2,2-bis(4-hydroxyphenyl)propane [trivial name: bisphenol A], bis(4-hydroxyphenyl)methane, 1,1-bis (4-hydroxyphenyl)-ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis (4-hydroxy-3-chlorophenyl)propane, 2,2-bis(4-hydroxy-3, 5-dichlorophenyl)propane and 2,2-bis(4-hydroxy-3,5-dibromophenyl)-propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane and 1,1-bis(4-hydroxyphenyl)cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3, 3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis (4-hydroxyphenyl)fluorene and 9,9-bis(4-hydroxy-3-methylphenyl)fluorene; dihydroxydiaryladamantanes such as bis(4-hydroxyphenyl)diphenylmethane, 1,3-bis(4-hydroxyphenyl)adamantane, 2,2-bis(4-hydroxyphenyl)adamantine and 1,3-bis(4-hydroxyphenyl)-5,7-dimethyladamantane; 4,4'-[1,3-phenylenebis(1-methylethylidene)] bisphenol; 10,10-bis(4-hydroxyphenyl)-9-anthrone; and 1,5-bis(4-hydroxyphenylthio)-2,3-dioxapentaene. Among them, 2,2-bis(4-hydroxyphenyl)-propane (trivial name: bisphenol A) is preferable.

These dihydric phenol compounds may be used alone, or two or more thereof may be used as a mixture.

Examples of the carbonate precursor include carbonyl halides, carbonic acid diesters and haloformates, and specific examples thereof include phosgene, diphenyl carbonate and a dihaloformate of a dihydric phenol compound. Among them, phosgene is preferable.

In addition, the polyorganosiloxane represented by the general formula (2) can be easily produced by subjecting a phenol having an olefinically unsaturated carbon-carbon bond (preferably vinyl phenol, allylphenol, eugenol, isopropenyl phenol, etc.) to a hydrosilylation reaction with an end of an polyorganosiloxane chain having a prescribed polymerization degree n. The above-described phenol is more preferably allylphenol or eugenol. In this case, Y in the general formula (2) becomes an organic residue derived from allylphenol or eugenol.

Examples of the polyorganosiloxane represented by the general formula (2) include the following.

(3)

(4)

(5)

(6)

(7)

(8)

(9)

(10)

(11)

In the general formulae (3) to (11), $R^3$ to $R^6$ are the same as $R^3$ to $R^6$ in the general formula (1). n is the same as n in the general formula (2). In addition, c represents a positive integer and is preferably an integer of from 1 to 6, more preferably an integer of from 1 to 3, and still more preferably 3.

Among them, the phenol-modified polyorganosiloxane represented by the general formula (3) is preferable from the viewpoint of easiness of polymerization. Furthermore, α,ω-bis[3-(o-hydroxyphenyl)propyl]polydimethylsiloxane that is one of the compound represented by the general formula (4), or α,ω-bis[3-(4-hydroxy-3-methoxyphenyl)propyl]polydimethylsiloxane that is one of the compound represented by the general formula (5), is preferable from the viewpoint of easiness of availability.

The above-described phenol-modified polyorganosiloxane can be produced by a known method. For example, the following is available as the known production method.

Cyclotrisiloxane and disiloxane are allowed to react with each other in the presence of an acid catalyst to synthesize an α,ω-dihydrogen organopolysiloxane. In this case, an α,ω-dihydrogen organopolysiloxane having a desired average repeating unit can be synthesized by changing a charging ratio between cyclotrisiloxane and disiloxane. Subsequently, this α,ω-dihydrogen organopolysiloxane is subjected to an addition reaction with a phenol compound having an unsaturated aliphatic hydrocarbon group such as allylphenol and eugenol, in the presence of a catalyst for hydrosilylation reaction, whereby a phenol-modified polyorganosiloxane having a desired average repeating unit can be produced.

In addition, at this stage, a cyclic polyorganosiloxane having a low molecular weight and an excessive amount of the above-described phenol compound remain as impurities, and therefore, these low-molecular weight compounds are distilled off upon heating under reduced pressure.

(Polycarbonate-Polyorganosiloxane Copolymer: PC-POS)

PC-POS obtained by the production method of the present invention has a repeating unit represented by the following general formula (I) and a constituent unit represented by the following general formula (II):

(I)

(II)

in the formulae, $R^1$ to $R^6$, X, Y, a, b, and n are the same as defined above.

In PC-POS, although the content of the constituent unit represented by the foregoing general formula (II) is not particularly limited, it is preferably from 1 to 25% by mass, and more preferably from 2 to 10% by mass. When the content of the constituent unit represented by the general formula (II) is 1% by mass or more, the impact resistance is excellent, and when it is not more than 25% by mass, the heat resistance is satisfactory.

In addition, in PC-POS, the average repeating number n in the constituent unit represented by the general formula (II) is preferably from 25 to 120, more preferably from 30 to 90, and still more preferably from 30 to 60. In PC-POS, when n is 25 or more, the impact resistance is excellent, and when it is not more than 120, the transparency is satisfactory.

Although a viscosity average molecular weight (Mv) of PC-POS is not particularly limited, it is preferably from 10,000 to 30,000, more preferably from 13,000 to 25,000, still more preferably from 15,000 to 23,000, and particularly preferably 15,000 to 21,000. When the viscosity average molecular weight of PC-POS falls within this range, the strength of a molded article is sufficient, the viscosity of the copolymer does not become excessively large, and the productivity at the time of production is stable.

[Production Method of Polycarbonate-Polyorganosiloxane Copolymer]

As described above, the method for producing a polycarbonate-polyorganosiloxane copolymer (PC-POS) according to the present invention includes the steps (A) to (C).

(Step (A))

The step (A) is a step of withdrawing a polymerization reaction solution obtained by polymerizing a dihydric phenol compound represented by the general formula (1), a carbonate precursor, and a polyorganosiloxane represented by the general formula (2) in the presence of an alkaline compound aqueous solution and a water-insoluble organic solvent continuously or intermittently from a reactor. In the step (A), the polymerization can also be conducted in the presence of a polymerization catalyst or a molecular weight modifier, as necessary. The alkaline compound aqueous solution, the water-insoluble organic solvent, the polymerization catalyst, and the molecular weight modifier are described below.

Although there is no particular limitation, from the viewpoint of increasing the transparency of PC-POS, the step (A) preferably comprises the following steps (a-1) and (a-2).

Step (a-1): A step of allowing a dihydric phenol compound represented by the general formula (1) and a carbonate precursor to react with each other in the presence of an alkaline compound aqueous solution and a water-insoluble organic solvent to produce a polycarbonate oligomer having a repeating unit represented by the general formula (I).

Step (a-2): A step of withdrawing a polymerization reaction solution obtained by polymerizing the above-described dihydric phenol compound, the polycarbonate oligomer obtained in the step (a-1), and a polyorganosiloxane represented by the general formula (2) in the presence of an alkaline compound aqueous solution and a water-insoluble organic solvent continuously or intermittently from a reactor.

(Step (a-1))

In the step (a-1), the reaction between the dihydric phenol compound and the carbonate precursor is not particularly limited, a known method can be adopted, and it is preferable to carry out the reaction in the presence of an alkaline compound aqueous solution and a water-insoluble organic solvent by the interfacial polymerization method. As necessary, the reaction can also be carried out in the presence of a polymerization catalyst, and such is preferable.

Examples of the alkaline compound include alkali metal hydroxides such as sodium hydroxide and potassium hydroxide; and alkaline earth metal hydroxides such as magnesium hydroxide and calcium hydroxide. Among them, an alkali metal hydroxide is preferable, and sodium hydroxide is more preferable. It should be noted that the dihydric phenol compound is preferably used as a mixture with the alkaline compound aqueous solution.

As the water-insoluble organic solvent, for example, a halogenated hydrocarbon such as methylene chloride, chlorobenzene and chloroform is preferable, and methylene chloride is more preferable.

Examples of the polymerization catalyst include tertiary amines and quaternary ammonium salts. Examples of the tertiary amine include trimethylamine, triethylamine and tripropylamine. Examples of the quaternary ammonium salt include trimethylbenzylammonium chloride and triethylammonium chloride. As the polymerization catalyst, a tertiary amine is preferable, and triethylamine is more preferable.

In the step (a-1), a molecular weight modifier may be used, as necessary. The molecular weight modifier is not particularly limited so long as the modifier is a monohydric phenol, and examples thereof include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, a monoalkylphenol having a linear or branched alkyl group having an average number of carbon atoms of from 12 to 35 at the ortho-, meta- or para-position, 9-(4-hydroxyphenyl)-9-(4-methoxyphenyl)fluorene, 9-(4-hydroxy-3-methylphenyl)-9-(4-methoxy-3-methylphenyl) fluorene and 4-(1-adamantyl)phenol. Among them, p-t-butylphenol, p-cumylphenol, and p-phenylphenol are preferable, and p-t-butylphenol is more preferable.

It should be noted that the molecular weight modifier is preferably used after dissolution in a water-insoluble organic solvent so as to regulate its concentration to preferably from 2 to 20% by mass, more preferably from 4 to 15% by mass, and still more preferably from 4 to 12% by mass. Examples of the water-insoluble organic solvent include the same solvents as those described above, and among them, methylene chloride is preferable.

Although an embodiment of the reaction is not particularly limited, a method is preferred in which the alkaline compound aqueous solution of a dihydric phenol compound, the water-insoluble organic solvent, and the carbonate precursor are supplied continuously or intermittently into a reactor, and as necessary, the polymerization catalyst aqueous solution is then added thereto while keeping the temperature of the reaction solution at not higher than 40° C.

A weight average molecular weight (Mw) of the obtained polycarbonate oligomer in this way is preferably from 500 to 3,000, more preferably from 700 to 2,000, and still more preferably from 800 to 1,500.

The reaction mixed solution obtained in the step (a-1) is separated into an aqueous phase and a water-insoluble organic solvent phase, and the water-insoluble organic solvent phase containing the polycarbonate oligomer is used in the step (a-2). Meanwhile, there may be the case where the polycarbonate oligomer or the dihydric phenol compound is also incorporated into the aqueous phase. Then, with respect to the aqueous phase, it is preferable that such an organic material is extracted with a water-insoluble organic solvent, and the resulting extract is used as a part or the whole of the water-insoluble organic solvent which is used in the step (a-2). It is preferable to conduct the extraction operation by mixing the subject aqueous phase with an aqueous phase which is obtained by washing with an acidic aqueous solution in a step (C) as described below and then separating. It should be noted that in the present specification, such an operation of extracting the aqueous phase with a water-insoluble organic solvent is sometimes called a waste water treatment.

(Step (a-2))

The step (a-2) is a step of withdrawing a polymerization reaction solution obtained by polymerizing the above-described dihydric phenol compound, the polycarbonate oligomer obtained in the step (a-1), and a polyorganosiloxane represented by the general formula (2) in the presence of an alkaline compound aqueous solution and a water-insoluble organic solvent continuously or intermittently from a reactor. As necessary, the reaction can also be carried out in the presence of a polymerization catalyst, and such is preferable.

An embodiment of the polymerization reaction in the step (a-2) is not particularly limited, and a known method can be adopted; however, from the viewpoint of minimizing an amount of the unreacted polyorganosiloxane (POS amount; in particular, in the case of an amount of polydimethylsiloxane, the amount will be called a PDMS amount) as far as possible, it is preferable to divide the polymerization reaction into a preliminary polymerization step and a main polymerization step.

(Preliminary Polymerization Step)

The preliminary polymerization step is a step of continuously or intermittently supplying a polycarbonate oligomer having the repeating unit represented by the general formula (I) and a water-insoluble organic solvent, a polyorganosiloxane represented by the general formula (2), a water-insoluble organic solvent, and an alkaline compound aqueous solution, thereby conducting the reaction. As necessary, the reaction can also be carried out in the presence of a polymerization catalyst, and such is preferable.

In the present step, operation procedures are preferable in which the polycarbonate oligomer having the repeating unit represented by the general formula (1) and the water-insoluble organic solvent, and the polyorganosiloxane represented by the general formula (2) are supplied and mixed; thereafter, the polymerization catalyst is supplied, as necessary; and subsequently, the alkaline compound aqueous solution is supplied and mixed.

(Main Polymerization Step)

The main polymerization step is a step of after cooling the preliminary polymerization solution obtained in the preliminary polymerization step to not higher than 25° C., continuously or intermittently supplying and mixing an alkaline compound aqueous solution of the dihydric phenol compound represented by the general formula (1) and a molecular weight modifier to conduct the main polymerization, and withdrawing the resulting polymerization reaction solution continuously or intermittently from a reactor. As necessary, the main polymerization can also be carried out in the presence of a polymerization catalyst, and such is preferable.

In the preliminary polymerization step, it is preferable that each of the polyorganosiloxane and the polycarbonate oligomer on the occasion of mixing the polyorganosiloxane is dissolved in or mixed with the water-insoluble organic solvent. In that case, the concentration of the polyorganosiloxane is preferably from 10 to 30% by mass, and more preferably from 15 to 25% by mass. The polycarbonate oligomer solution is regulated such that its solid content concentration is preferably not more than 300 g/L, more preferably from 170 to 250 g/L, and still more preferably from 180 to 240 g/L. Then, the transparency of the polycarbonate-polyorganosiloxane copolymer can be made high. This is because the compatibility between the polyorganosiloxane and the polycarbonate oligomer is low, and hence, when the polyorganosiloxane concentration or the polycarbonate oligomer concentration (solid content concentration) is too high, the polyorganosiloxane tends to exist in a dispersed state in the polycarbonate oligomer. When the polyorganosiloxane concentration is regulated to 10 to 30% by mass, and the polycarbonate oligomer concentration is regulated to not more than 300 g/L, the polyorganosiloxane can be quickly and sufficiently dissolved in the polycarbonate oligomer solution with ease, and hence, the uniformity of the polymerization reaction is enhanced, whereby a polycarbonate-polyorganosiloxane copolymer having excellent transparency tends to be obtained.

A supply ratio between a supply rate of the above-described polycarbonate oligomer and a supply rate of the above-described polyorganosiloxane [(polycarbonate oligomer)/(polyorganosiloxane)] may be properly set taking into consideration a composition of PC-POS to be produced.

In the preliminary polymerization step, the polymerization catalyst is preferably used as a solution of a water-insoluble organic solvent from the viewpoint of enhancing the uniformity of the reaction to make the transparency of the resulting polycarbonate-polyorganosiloxane copolymer high. Examples of the water-insoluble organic solvent include the same solvents as those described above, and among them, methylene chloride is preferable from the viewpoint of enhancing the dispersibility of the polymerization catalyst. The concentration of the polymerization catalyst in the polymerization catalyst solution is preferably from 0.05 to 5% by mass, and more preferably from 0.1 to 5% by mass.

In the preliminary polymerization step, the alkaline compound is preferably used as an alkaline compound aqueous solution. In addition, in that case, it is preferable to regulate the concentration (alkali concentration) of the alkaline compound aqueous solution to from 2 to 15% by mass. On the occasion of the preliminary polymerization, the alkaline compound is consumed by three reactions including (1) a reaction between the polycarbonate oligomer and the polyorganosiloxane, (2) a reaction between a chloroformate group of the polycarbonate oligomer and a hydroxyl group, and (3) a decomposition reaction of a chloroformate group of the polycarbonate oligomer. When the alkali concentration of the alkaline compound aqueous solution which is supplied is not more than 15% by mass, the progress of the above-described reaction (3) can be suppressed from the standpoint of reaction rate, and an increase of the amount of the unreacted polyorganosiloxane can be suppressed. The alkali concentration of the alkaline compound aqueous solution which is supplied at the time of preliminary polymerization is preferably from 3 to 15% by mass, and more preferably from 3 to 12% by mass from the viewpoints of reaction efficiency of the polyorganosiloxane and transparency of the polycarbonate-polyorganosiloxane copolymer.

It should be noted that the preliminary polymerization is carried out by an interfacial polymerization reaction. In general, in the case of an interfacial polymerization reaction, there are included two ways of the case where the aqueous phase is a continuous phase and the case where the water-insoluble organic solvent phase is a continuous phase, and in order to obtain PC-POS having excellent transparency, it is preferable that the water-insoluble organic solvent phase is a continuous phase. For the purpose of making the uniformity of a reaction between the polyorganosiloxane and the polycarbonate oligomer high in order to obtain the transparency, the water-insoluble organic solvent phase is stirred as a continuous phase and then the uniformity between the both can be made high, since both of the polyorganosiloxane and the polycarbonate oligomer exist in the water-insoluble organic solvent phase.

In the main polymerization step, the preliminary polymerization solution obtained in the preliminary polymerization step is preferably once cooled to not higher than 25° C. (preferably about 15 to 20° C.). Thereafter, the alkaline compound aqueous solution of the dihydric phenol compound represented by the general formula (1) and the molecular weight modifier (chain-end terminator), and as necessary, a polymerization catalyst are continuously or intermittently supplied and mixed, thereby conducting the main polymerization.

With respect to the alkaline compound, the molecular weight modifier (chain-end terminator) and the polymerization catalyst, the same materials as those described above are exemplified, and preferred materials are also the same. It should be noted that the molecular weight modifier is preferably used upon being dissolved in a water-insoluble organic solvent so as to regulate its concentration to preferably from 2 to 20% by mass, more preferably from 4 to 15% by mass, and still more preferably from 4 to 12% by mass. Examples of the water-insoluble organic solvent include the same solvents as those described above, and among them, methylene chloride is preferable.

The thus obtained polymerization reaction solution is withdrawn continuously or intermittently from a reactor and transferred into the step (B).

(Step (B))

The step (B) is a step of separating the polymerization reaction solution withdrawn in the step (A) (in the case where the step (A) comprises the step (a-1) and the step (a-2), the polymerization reaction solution withdrawn after the step (a-2) is referred to herein) into an aqueous phase and a water-insoluble organic solvent phase. The method for separation is not particularly limited, and standing separation may be adopted. From the viewpoint of making the separated state between the aqueous solution and the water-insoluble organic solvent phase satisfactory, it is preferable to conduct centrifugation. Although the centrifugation condition is not particularly limited, in general, a rotational speed is preferably from about 1,000 to 3,000 rpm.

In many cases, the water-insoluble organic solvent phase obtained after the above-described separation contains a trace amount of the dihydric phenolic compound, and therefore, it is preferable to wash the water-insoluble organic solvent phase with an alkali aqueous solution (hereinafter sometimes referred to as "alkali washing"). Examples of the alkaline compound which is used for the alkali aqueous solution include the same materials as those used in the step (A), and it is preferable to use the same material. After washing with the alkali aqueous solution, the resultant is separated into an aqueous phase and a water-insoluble organic solvent phase. On this occasion, the method for separation is not particularly limited, and standing separation may be adopted. From the viewpoint of making the separated state between the aqueous solution and the water-insoluble organic solvent phase satisfactory, it is preferable to conduct centrifugation at the above-described rotational speed. Although the amount of the alkali aqueous solution which is used for washing is not particularly limited, it is preferably from about 5 to 40% by volume, more preferably from 5 to 30% by volume, and still more preferably from 10 to 20% by volume in the whole liquid, from the viewpoints of a washing effect and a reduction of the generation amount of waste water. When the amount of the alkali aqueous solution is not more than 40% by volume, the continuous phase does not change from the organic phase to the aqueous phase, and the extraction efficiency from the organic phase can be kept high.

Since the dihydric phenolic compound or the alkaline compound is contained in the aqueous solution obtained in the step (B), it is preferable to reuse the aqueous phase for the step (A), particularly the above-described step (a-1) from the viewpoint of production costs.

(Step (C))

The step (C) is a step of after washing the water-insoluble organic solvent phase separated in the step (B) with an acidic aqueous solution (hereinafter sometimes referred to as "acid washing"), separating the resultant into an aqueous phase and a water-insoluble organic solvent phase. The polymerization catalyst or a trace amount of the alkaline compound, which may be contained in the water-insoluble organic solvent phase separated in the step (B), can be removed by this acid washing. It should be noted that the method for separation is not particularly limited, and it may be standing separation. Examples of the acid which is used for preparation of the acidic aqueous solution include hydrochloric acid and phosphoric acid, with hydrochloric acid being preferable; however, it should be construed that the acid is not particularly limited thereto.

Since the acid or the inorganic material used for washing tends to be contained in the water-insoluble organic solvent phase obtained by the above-described separation, it is preferable to conduct washing with water at least one time (hereinafter sometimes referred to as "water washing"). Here, the degree of cleanliness of the water-insoluble organic solvent phase can be evaluated according to an electric conductivity of the aqueous phase after washing. The intended electric conductivity is preferably not more than 1 mS/m, and more preferably not more than 0.5 mS/m. After washing with water, the resultant is separated into an aqueous phase and a water-insoluble organic solvent phase. On this occasion, the method for separation is not particularly limited, and it may be standing separation.

Since PC-POS and under some circumstances, the polymerization catalyst and the like are contained in the aqueous phase separated in the step (C) (also including the aqueous phase after water washing), these are extracted with a water-insoluble organic solvent, and a part or the whole of the extract is reused for the step (A), particularly the above-described step (a-2) properly after a devolatilization process or a distillation purification process for the removal of carbon dioxide. As for the devolatilization step, a method described in JP 2005-60599-A can be adopted. On the occasion of reusing the water-insoluble organic solvent used for the extraction, since the water-insoluble organic solvent is in general conveyed by a tubing pump, the PC-POS concentration in the whole amount of the water-insoluble organic solvent to be reused is regulated to not more than 2% by mass (preferably not more than 1.5% by mass, and more preferably not more than 1% by mass), from the viewpoint of suppressing the generation of cavitation in the tubing pump, or the like and also from the viewpoint of stably carrying out the devolatilization operation. In addition, the aqueous phase that is a target for the extraction with the water-insoluble organic solvent includes an aqueous phase after the acid washing and an aqueous phase after the water washing, and in each of the water-insoluble organic solvents which are used for the extraction, it is preferable to regulate the PC-POS concentration to not more than 2% by mass (more preferably not more than 1.5% by mass, and still more preferably not more than 1% by mass). For this reason, it is effective to control the PC-POS concentration in the aqueous phase when combined with the aqueous phase obtained in the step (C) to not more than 2% by mass, preferably not more than 1.5% by mass, and more preferably not more than 1% by mass. In addition, in the step (C), in each of the aqueous phase after the acid washing and the aqueous phase after the water washing, it is effective to regulate the PC-POS concentration in the aqueous phase to preferably not more than 2% by mass, more preferably not more than 1.5% by mass, and still more preferably not more than 1% by mass.

Furthermore, in the present invention, it is preferable that the aqueous phase obtained by separating the reaction mixed solution obtained in the above-described step (a-1) into the aqueous phase and the water-insoluble organic solvent phase is mixed with the aqueous phase obtained by separating after washing with the acidic aqueous solution in the present step (C); the resulting aqueous phase is extracted with a water-insoluble organic solvent; the content of the polycarbonate-polyorganosiloxane copolymer in the resulting extract is controlled to not more than 2% by mass (preferably not more than 1.5% by mass, and more preferably not more than 1% by mass); and a part or the whole of the extract is reused for the step (A).

Although detailed reasons are not elucidated yet, as a result of observation by the present inventors, it may be assumed that on the occasion of stirring the water-insoluble organic solvent containing PC-POS and the washing water in the washing step, the water-insoluble organic solvent phase incorporates a gas therein, and when subjected to standing separation, the water-insoluble organic solvent phase containing the gas therein floats in the aqueous phase while entraining the gas and is brought into a state where it easily resides in the aqueous phase; and thus, it has been understood that the PC-POS concentration in the aqueous phase becomes high, and in its turn, the PC-POS concentration in the water-insoluble organic solvent used for the extraction becomes high. This phenomenon is a phenomenon which is inherent to PC-POS and which is not caused in general polycarbonate resins (polycarbonate resins having the repeating unit represented by the general formula (I) and not having the constituent unit represented by the general formula (II)). For example, when on the occasion of conducting washing, the washing temperature is kept at not higher than 37° C. (preferably not higher than 36° C., more preferably not higher than 34° C., still more preferably not higher than 30° C., yet still more preferably not higher than 29° C., and particularly preferably not higher than 28° C.), the above phenomenon is suppressed, and it becomes easy to control the PC-POS concentration in the aqueous phase obtained in the step (C) to the above-described preferred range, resulting in making it easy to control the PC-POS concentration in the water-insoluble organic solvent to the above-described predetermined value or less. As necessary, cooling is conducted such that the temperature becomes the above-described predetermined value or less because of possible influences of stirring heat or radiation heat by solar radiation to the instruments or conduits. In addition, it is also effective to shield the solar radiation. A lower limit value of the washing temperature is generally about 5° C. (preferably 10° C.). It should be noted that in the case of standard polycarbonate resins (polycarbonate resins having the repeating unit represented by the general formula (I) and not having the constituent unit represented by the general formula (II)), it is preferred that the washing temperature is higher, since a separation rate between the aqueous phase and the water-insoluble organic solvent phase becomes fast, and in general, it is preferable to make the washing temperature high within the range where it does not exceed 40° C. as a boiling point of methylene chloride used as the water-insoluble organic solvent, an aspect of which is different from the present invention.

Besides, in order to control the PC-POS concentration in the water-insoluble organic solvent to be reused to the above-described predetermined value or less, it is also effective to take a method of providing a separator in a standing separation vessel, or a method such as centrifugation and membrane separation, thereby reducing the PC-POS concentration in the aqueous phase to be separated.

PC-POS can be obtained by concentrating the water-insoluble organic solvent phase after the step (C) [concentration step], pulverizing [pulverization step], and drying [drying step], or further granulating [granulation step]. It is preferable that the water-insoluble organic solvent which has been removed in the concentration step is reused for the step (A), or reused as a solvent for extracting organic materials such as PC-POS from the aqueous phase which has been separated in the washing step. In the drying step, in general, it is preferable to conduct drying at from about 80 to 160° C. under reduced pressure.

It should be noted that it is also preferable to reuse the water-insoluble organic solvent phase obtained in the concentration step, and for the same reason as described above, the PC-POS concentration in the water-insoluble organic solvent phase is also controlled to preferably not more than 2% by mass, more preferably not more than 1.5% by mass, and still more preferably not more than 1% by mass.

It should be noted that in the present specification, those which are described to be preferable can be arbitrarily combined, and it may be said that combinations of those which are described to be preferable with each other are more preferable.

EXAMPLES

Examples of the present invention are further described. It should be noted that the present invention is not limited to these Examples. Here, in each of the Examples, an amount of a polydimethylsiloxane (PDMS) residue, a viscosity number, a viscosity average molecular weight (Mv), an amount of unreacted PDMS and a conversion of PDMS were determined by the following methods.

It should be noted that in the following Examples, means for confirming the effects of the present invention were taken by the batchwise production for the sake of convenience.

(1. Amount of Polydimethylsiloxane (PDMS) Residue)

The amount of a PDMS residue was determined by proton NMR spectroscopy of methyl groups in PDMS.

(2. Viscosity Number)

The viscosity number was measured in conformity with ISO 1628-4 (1999).

(3. Method of Measuring Viscosity Average Molecular Weight (Mv))

The viscosity average molecular weight was calculated from the following relational expression (Schnell's equation) by measuring a limiting viscosity [η] of a methylene chloride solution at 20° C. with an Ubbelohde-type viscometer.

$$[\eta]=1.23\times 10^{-5}\times Mv^{0.83}$$

(4. Calculation Method of Amount of Unreacted PDMS)

(i) To a solution of 6 g of a polycarbonate-polydimethylsiloxane copolymer obtained in each of the Examples in 50 mL of methylene chloride, 50 mL of acetone and 150 mL of n-hexane were added and mixed, followed by allowing the mixture to stand for 30 minutes.

(ii) Suction filtration with a filter paper (No. 5A) was conducted to obtain a filtrate, the recovered filtrate was concentrated to dryness, and a weight of the resulting dry solid was measured. The resulting dry solid was dissolved in deuterichloroform and subjected to $^1$H-NMR measurement. A proportion z (%) of unreacted PDMS was calculated from an integrated value x of a proton of a hydroxyl group at the ortho-position of unreacted phenol-modified polydimethylsiloxane (δ 6.7 ppm) and an integrated value y of a proton assigned to a methylene chain (δ 0.6 ppm) according the following expression.

$$z=2\times x/y\times 100$$

(iii) Meanwhile, a standard sample in which from 150 to 2,000 ppm of phenol-modified polydimethylsiloxane was added to a polycarbonate-polydimethylsiloxane copolymer was separately prepared and subjected to the same operations as those described above, thereby determining a relational expression between z and an amount of unreacted PDMS (ppm;=the addition amount of phenol-modified polydimethylsiloxane).

The amount of unreacted PDMS (ppm) was calculated from z determined in the foregoing (ii) and the relational expression determined in the foregoing (iii).

(5. Conversion of PDMS)

A conversion of PDMS was calculated according to the following calculation expression.

Conversion of PDMS (% by mass)=[1−{amount of unreacted PDMS (% by mass)}/{amount of PDMS residue (% by mass)}]×100

Synthesis Example 1

Production of Polycarbonate Oligomer Solution
(Step (A)-Step (a-1))

To a 5.6% by mass sodium hydroxide aqueous solution, sodium dithionite was added in an amount of 2,000 ppm by mass relative to bisphenol A to be dissolved later, and bisphenol A was then dissolved therein such that the concentration of bisphenol A was 13.5% by mass, thereby preparing a solution of bisphenol A in aqueous sodium hydroxide.

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr and 4.0 kg/hr, respectively. The tubular reactor had a jacket portion, and cooling water was passed through the jacket to keep the reaction solution at a temperature of not higher than 40° C.

The reaction solution which had exited the tubular reactor was continuously introduced into a baffled vessel-type reactor having an internal volume of 40 L and provided with a sweptback blade, and then, 2.8 L/hr of the solution of bisphenol A in aqueous sodium hydroxide, 0.07 L/hr of a 25% by mass sodium hydroxide aqueous solution, 17 L/hr of water, and 0.64 L/hr of a 1% by mass triethylamine aqueous solution were further added to the reactor to conduct a reaction. The reaction solution overflown from the vessel-type reactor was continuously extracted and allowed to stand to separate and remove an aqueous phase, and a methylene chloride phase was then collected.

The concentration of the thus obtained polycarbonate oligomer solution (methylene chloride solution) was 318 g/L, and the concentration of a chloroformate group thereof was 0.75 mol/L. In addition, the polycarbonate oligomer had a weight average molecular weight (Mw) of 1,190.

It should be noted that the weight average molecular weight (Mw) was measured as a molecular weight (weight average molecular weight: Mw) in terms of standard polystyrene by GPC (column: TOSOH TSK-GEL MULTIPORE HXL-M (two)+Shodex KF801 (one), temperature: 40° C., flow rate: 1.0 mL/min, detector: RI) with tetrahydrofuran (THF) as a developing solvent.

Examples 1 to 2 and Comparative Example 1

Production of PC-PDMS-1

(Step (A)-Step (a-2))

In a vessel-type reactor having an internal volume of 1 L and provided with a baffle board and a paddle-type stirring blade, 377 mL of the polycarbonate oligomer (PCO) solution produced in Synthesis Example 1, 222 mL of methylene chloride (MC), 9.87 g of allylphenol terminal-modified polydimethylsiloxane (PDMS-1) having a repeating number n of dimethylsiloxane units of 40, and 220 µL of triethylamine were charged, 35.4 g of a 6.4% by mass sodium hydroxide aqueous solution was added under stirring, and a reaction (preliminary polymerization) between the polycarbonate oligomer and the allylphenol terminal-modified PDMS was conducted for 10 minutes.

To the resulting polymerization solution, a solution of p-t-butylphenol (PTBP) in methylene chloride (solution of 3.49 g of PTBP in 20 mL of methylene chloride) and a solution of bisphenol A in aqueous sodium hydroxide (solution prepared by dissolving 19.0 g of bisphenol A in an aqueous solution of 14.7 g of sodium hydroxide and 58 mg of sodium dithionite in 215 mL of water) were added, and a polymerization reaction (main polymerization) was conducted for 50 minutes.

(Step (B): Separation Step and Alkali Washing Step)

The polymerization solution obtained in the step (A) was diluted with 120 mL of methylene chloride; after stirring for 10 minutes, the resultant was centrifuged into a methylene chloride phase containing the polycarbonate and an aqueous phase containing an excessive amount of bisphenol A and sodium hydroxide; and the methylene chloride phase was isolated.

Subsequently, to the same vessel-type reactor as used in the polymerization reaction, 127 mL of a 0.03 mol/L sodium hydroxide aqueous solution was added to 720 mL of the isolated methylene chloride phase; after stirring at 500 rpm for 10 minutes, the resultant was centrifuged into a methylene chloride phase containing the polycarbonate and an aqueous phase; and the methylene chloride phase was isolated.

(Step (C): Acid Washing Step and Water Washing Step)

Each of 700 mL of the isolated methylene chloride phase and 124 mL of 0.2 mol/L hydrochloric acid was adjusted to a temperature shown in Table 1.

The both solutions were charged in the same vessel-type reactor as used in the polymerization reaction; after stirring at 500 rpm for 10 minutes while keeping the temperature shown in Table 1, the stirring was stopped; after allowing the resultant to stand for 20 minutes, an aqueous phase (1) containing a methylene chloride phase floated on the upper surface of the aqueous phase was recovered; and a polymer concentration in the aqueous phase (1) was measured. The results are shown in Table 1.

Each of 650 mL of a methylene chloride phase remained after removing the organic phase floated on the upper surface of the aqueous phase and the aqueous phase and 115 mL of pure water was adjusted to a temperature shown in Table 1; then, the both temperature-adjusted solutions were charged in the same one-liter vessel-type reactor; after stirring at 500 rpm for 10 minutes while keeping the temperature shown in Table 1, the stirring was stopped; after allowing the resultant to stand for 20 minutes, an aqueous phase (2) containing a methylene chloride phase floated on the upper surface of the aqueous phase was recovered; and a polymer concentration in the aqueous phase (2) was measured. The results are shown in Table 1.

It should be noted that in the case of Comparative Example 1, while the methylene chloride phase and the aqueous phase were separated from each other, it was confirmed that a proportion of a part of the methylene chloride phase floated on the upper surface of the aqueous phase was large.

(Waste Water Treatment)

In a one-liter stirring vessel provided with a baffle board and a paddle-type stirring blade, the both waste waters of the above-described aqueous phase (1) and aqueous phase (2) were poured. Then, 222 mL of methylene chloride, the amount of which is corresponding to the amount used in the step (A), was added, and after stirring at 240 rpm for 10 minutes, the stirring was stopped. The resultant was subjected to standing separation for 60 minutes, and the methylene chloride phase was then isolated. The PC-PDMS concentration in the isolated methylene chloride phase (3) was measured. The results are shown in Table 1.

(Recovery of PC-PDMS)

In order to confirm polymer properties, the methylene chloride phase remained after removing the methylene chloride phase floated on the upper surface of the aqueous phase and the aqueous phase was washed with water in an amount of 15% by volume relative to the solution until an electric conductivity in the aqueous phase after washing reached 0.1 mS/m or less. The solution of PC-PDMS in methylene chloride obtained by washing was concentrated and pulverized, and the resulting flake was dried at 120° C. under reduced pressure.

The thus obtained polycarbonate-polydimethylsiloxane copolymer (PC-PDMS-1) had an amount of a polydimethylsiloxane residue of 6.3% by mass, a viscosity number of 47.0, and a viscosity average molecular weight (Mv) of 17,500. In addition, an amount of unreacted PDMS-1 was not more than 150 ppm, and a conversion of PDMS-1 was 99.5% or more.

Example 3

Production of PC-PDMS-2

A polycarbonate-polydimethylsiloxane copolymer (PC-PDMS-2) was produced in the same operations as those in Example 2, except for changing the use amount of the 2-allylphenol terminal-modified PDMS (PDMS-1) having a repeating number of dimethylsiloxane units of 40 to 5.76 g.

The resulting polycarbonate-polydimethylsiloxane copolymer (PC-PDMS-2) had an amount of a polydimethylsiloxane residue of 3.5% by mass, a viscosity number of 47.5, and a viscosity average molecular weight (Mv) of 17,700. In addition, an amount of unreacted PDMS-1 was not more than 150 ppm, and a conversion of PDMS-1 was 99.5% or more.

Comparative Example 2

Production of PC-PDMS-2

A polycarbonate-polydimethylsiloxane copolymer (PC-PDMS-2) was produced by conducting the same operations as those in Example 3, except for changing the acid washing temperature and the water washing temperature to temperatures shown in Table 1, respectively.

The resulting PC-PDMS-2 had an amount of a polydimethylsiloxane residue of 3.5% by mass, a viscosity number of 47.5, and a viscosity average molecular weight (Mv) of 17,700. In addition, an amount of unreacted PDMS-1 was not more than 150 ppm, and a conversion of PDMS-1 was 99.5% or more.

It should be noted that in the washing step of Comparative Example 2, while the methylene chloride phase and the aqueous phase were separated from each other, it was confirmed that a proportion of a part of the methylene chloride phase floated on the upper surface of the aqueous phase was large.

Example 4

Production of PC-PDMS-3

A polycarbonate-polydimethylsiloxane copolymer (PC-PDMS-3) was produced in the same operations as those in Example 2, except for using 2-allylphenol terminal-modified PDMS (PDMS-2) having a repeating number of dimethylsiloxy units of 50 instead of the 2-allylphenol terminal-modified PDMS (PDMS-1) having a repeating number of dimethylsiloxy units of 40.

The resulting PC-PDMS-3 had an amount of a polydimethylsiloxane residue of 6.1% by mass, a viscosity number of 47.3, and a viscosity average molecular weight (Mv) of 17,600. In addition, an amount of unreacted PDMS-1 was not more than 150 ppm, and a conversion of PDMS-1 was 99.5% or more.

Example 5

Production of PC-PDMS-4

A polymerization step, a washing step, and a polymer recovery step of a polycarbonate-polydimethylsiloxane copolymer (PC-PDMS-4) were carried out in the same manner as that in Example 2, except for using 2-allylphenol terminal-modified PDMS (PDMS-3) having a repeating number of dimethylsiloxy units of 30 instead of the 2-allylphenol terminal-modified PDMS (PDMS-1) having a repeating number of dimethylsiloxy units of 40.

The resulting PC-PDMS-4 had an amount of a polydimethylsiloxane residue of 6.0% by mass, a viscosity number of 47.5, and a viscosity average molecular weight (Mv) of 17,700. In addition, an amount of unreacted PDMS-1 was not more than 150 ppm, and a conversion of PDMS-1 was 99.5% or more.

Comparative Example 3

Production of PC-PDMS-4

A polymerization step, a washing step, and a polymer recovery step of a polycarbonate-polydimethylsiloxane copolymer (PC-PDMS-4) were carried out by conducting the same operations as those in Example 5, except for changing the acid washing temperature and the water washing temperature to temperatures described in Table 1, respectively.

It should be noted that in the washing step of Comparative Example 3, while the methylene chloride phase and the aqueous phase were separated from each other, it was confirmed that a part of the methylene chloride phase was easy to float on the upper surface of the aqueous phase.

The resulting PC-PDMS-4 had an amount of a polydimethylsiloxane residue of 6.0% by mass, a viscosity number of 47.5, and a viscosity average molecular weight (Mv) of 17,700. In addition, an amount of unreacted PDMS-1 was not more than 150 ppm, and a conversion of PDMS-1 was 99.5% or more.

Example 6

Production of PC-PDMS-5

A polycarbonate-polydimethylsiloxane copolymer (PC-PDMS-5) was produced in the same operations as those in Example 2, except for changing the use amount of the p-t-butylphenol (PTBP) from 3.49 g to 3.03 g.

The resulting PC-PDMS-5 had an amount of a polydimethylsiloxane residue of 6.0% by mass, a viscosity number of 51.6, and a viscosity average molecular weight (Mv) of 19,500. In addition, an amount of unreacted PDMS-1 was not more than 150 ppm, and a conversion of PDMS-1 was 99.5% or more.

Reference Example 1

Production of BPA-PC

In a vessel-type reactor having an internal volume of 1 L and provided with a baffle board and a paddle-type stirring blade, 377 mL of the polycarbonate oligomer solution produced in Synthesis Example 1, 222 mL of methylene chloride, 3.49 g of p-t-butylphenol (PTBP), and 40 µL of triethylamine were charged, an aqueous solution of bisphenol A in sodium hydroxide [solution prepared by dissolving 29.0 g of bisphenol A in an aqueous solution of 15.8 g of sodium hydroxide and 58 mg of sodium dithionite in 232 mL of water] was added thereto under stirring, and a polymerization reaction was carried out for 50 minutes.

Subsequent steps were carried out in the same manner as that in Example 1, thereby producing a polycarbonate-based resin using bisphenol A (BPA-PC).

TABLE 1

|  |  | Example | | | | | | Comparative Example | | | Reference Example |
|---|---|---|---|---|---|---|---|---|---|---|---|
|  |  | 1 | 2 | 3 | 4 | 5 | 6 | 1 | 2 | 3 | 1 |
| Polymer | PC-PDMS-1[*1] | ○ | ○ |  |  |  |  | ○ |  |  |  |
|  | PC-PDMS-2[*2] |  |  | ○ |  |  |  |  | ○ |  |  |
|  | PC-PDMS-3[*3] |  |  |  | ○ |  |  |  |  |  |  |
|  | PC-PDMS-4[*4] |  |  |  |  | ○ |  |  |  | ○ |  |
|  | PC-PDMS-5[*5] |  |  |  |  |  | ○ |  |  |  |  |
|  | BPA-PC[*6] |  |  |  |  |  |  |  |  |  | ○ |
| Washing temperature [acid washing and water washing] (° C.)[*7] |  | 34 | 36 | 36 | 36 | 36 | 36 | 38 | 38 | 38 | 38 |
| Polymer concentration (% by mass) | Aqueous phase (1) | 0.61 | 1.0 | 0.95 | 0.54 | 1.9 | 1.0 | 2.8 | 2.9 | 3.0 | <0.01[*8] |
|  | Aqueous phase (2) | 0.55 | 0.82 | 0.93 | 0.50 | 1.7 | 0.8 | 2.6 | 2.6 | 2.9 | <0.01[*8] |
|  | Methylene chloride phase (3) | 0.65 | 1.0 | 1.0 | 0.56 | 2.0 | 1.0 | 3.0 | 3.1 | 3.3 | <0.01[*8] |

The notes in Table 1 are described below.
[*1]PC-PDMS of Mv = 17,500 (n = 40, amount of PDMS residue = 6.3% by mass)
[*2]PC-PDMS of Mv = 17,700 (n = 40, amount of PDMS residue = 3.5% by mass)
[*3]PC-PDMS of Mv = 17,600 (n = 50, amount of PDMS residue = 6.1% by mass)
[*4]PC-PDMS of Mv = 17,700 (n = 30, amount of PDMS residue = 6.0% by mass)
[*5]PC-PDMS of Mv = 19,500 (n = 40, amount of PDMS residue = 6.0% by mass)
[*6]BPA-PC of Mv = 17,700
[*7]The acid washing temperature and the water washing temperature are the same.
[*8]Less than 0.01% by mass Test Examples 1 to 6, Comparative Test Examples 1 to 3, and Reference Test Example 1

Reuse of Methylene Chloride Phase (3) Generated in the Waste Water Treatment for Step (A)

Assuming the reuse of the methylene chloride phase (3) generated in the waste water treatment in each of the above-described Examples for the step (A), the following verification experiment was conducted. In the verification experiment, the operation stability of a devolatilization column and the continuous supply stability of methylene chloride from a devolatilization column to a polymerization step were evaluated according to the following evaluation criteria.

Good: The methylene chloride within a round bottom flask was transparent, bubbling was not generated, and the methylene chloride could be stably extracted from the inside of the flask.

Poor: A gas was incorporated into the methylene chloride with a lapse of time, and the content was becoming cloudy, whereby it became difficult to conduct the stable extraction of methylene chloride from the inside of the flask.

It should be noted that since a relatively large amount of the methylene chloride phase (3) was required for the verification experiment, the following model solution (4) was prepared to conduct the verification experiment.

(Preparation of Model Solution (4))

Each PC-PDMS obtained in the above-described polymer recovery was dissolved in methylene chloride. A blending amount at the time of preparation and a PC-PDMS concentration are shown in Table 2. It should be noted that in Reference Test Example 1, a BPA-PC concentration in methylene chloride was intentionally set high.

(Verification Experiment)

Figure 1:
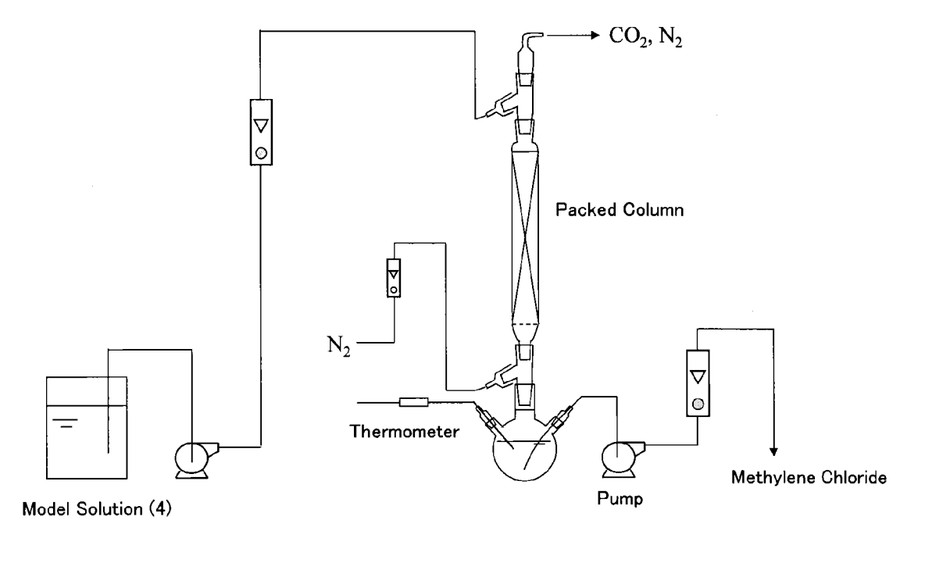
FIG. 1 is a diagrammatic view of a verification experimental apparatus used in the Test Examples.

An apparatus shown in FIG. 1 was prepared to conduct the verification experiment. A packed column had an inner diameter of 30 mm and a height of a packed layer of 1,070 mm, and "Dixon Packing SUS304" having a diameter of 3 mm (manufactured by Takenaka Wire Cloth Co., Ltd.) was used as a packing.

The prepared model solution (4) was supplied from an upper part of the packed column under the conditions of 20° C., atmospheric pressure at a rate of 18 L/hr. A nitrogen gas was supplied at a flow rate of 1.7 NL/min from a lower part of the packed column and brought into countercurrent contact with methylene chloride. In the bottom of the packed column, the round bottom flask which had been previously charged with methylene chloride was set, and the methylene chloride was continuously extracted so as to keep a liquid level constant by using "Diaphragm Pump NP-GX-400U", manufactured by Nihon Seimitsu Kagaku Co., Ltd.

TABLE 2

|  |  | Test Example | | | | | | Comparative Test Example | | | Reference Test Example |
|---|---|---|---|---|---|---|---|---|---|---|---|
|  |  | 1 | 2 | 3 | 4 | 5 | 6 | 1 | 2 | 3 | 1 |
| Polymer | PC-PDMS-1[*1] | 330 g | 500 g |  |  |  |  | 1.5 kg |  |  |  |
|  | PC-PDMS-2[*2] |  |  | 500 g |  |  |  |  | 1.55 kg |  |  |
|  | PC-PDMS-3[*3] |  |  |  | 280 g |  |  |  |  |  |  |
|  | PC-PDMS-4[*4] |  |  |  |  | 1 kg |  |  |  | 1.65 kg |  |

TABLE 2-continued

|  |  | Test Example | | | | | | Comparative Test Example | | | Reference Test Example |
| --- | --- | --- | --- | --- | --- | --- | --- | --- | --- | --- | --- |
|  |  | 1 | 2 | 3 | 4 | 5 | 6 | 1 | 2 | 3 | 1 |
|  | PC-PDMS-5*5 |  |  |  |  |  | 500 g |  |  |  |  |
|  | BPA-PC*6 |  |  |  |  |  |  |  |  |  | 1.5 kg |
| Methylene chloride |  | 46.7 kg | 49.5 kg | 49.5 kg | 49.7 kg | 49 kg | 49.5 kg | 48.5 kg | 48.4 kg | 48.4 kg | 48.5 kg |
| Polymer concentration (% by mass) |  | 0.66 | 1.0 | 1.0 | 0.56 | 2.0 | 1.0 | 3.0 | 3.1 | 3.3 | 3.0 |
| Operation state of pump |  | Good | Good | Good | Good | Good | Good | Poor | Poor | Poor | Good |

When the model solution (4) corresponding to Examples 1 to 6 and Reference Example 1 was used (Test Examples 1 to 6 and Reference Test Example 1), in all of the cases, not only the methylene chloride within the round bottom flask was transparent, but bubbling or the like was not generated. In addition, the extraction flow rate was about 18 L/hr and stable.

On the other hand, when the model solution (4) corresponding to Comparative Examples 1 to 3 was used (Comparative Test Examples 1 to 3), not only bubbling was occurred in an upper part of the liquid surface within the round bottom flask, but a gas was incorporated into the methylene chloride, and the content started to become cloudy. Thereafter, the extraction flow rate suddenly decreased from 18 L/hr to about 4 L/hr, the liquid level within the round bottom flask started to increase, and it became difficult to stably extract the methylene chloride within the flask, so that the experiment was stopped. It was considered that the decrease of the extraction flow rate was caused due to entering a gas into the pump, resulting in defective operation of a check valve.

It should be noted that as shown in Reference Test Example 1, in the case of BPA-PC, influences of the polymer concentration as in the case of PC-PDMS were not observed.

INDUSTRIAL APPLICABILITY

The polyorganosiloxane-polycarbonate copolymer obtained by the present invention is expected to find utilization in a wide variety of fields such as the field of electrical and electronic equipment, the field of an automobile, etc. In particular, the polyorganosiloxane-polycarbonate copolymer can be utilized as, for example, a material for the casing of a mobile phone, a mobile personal computer, a digital camera, a video camera, an electric power tool, or the like, or a material for other articles for daily use.

The invention claimed is:

1. A method for continuous production of a polycarbonate-polyorganosiloxane copolymer, comprising:
   (A) withdrawing a polymerization reaction solution obtained by polymerizing a dihydric phenol compound of formula (1), a carbonate precursor, and a polyorganosiloxane of formula (2) in the presence of an alkaline compound aqueous solution and a water-insoluble organic solvent continuously or intermittently from a reactor;
   (B) separating the polymerization reaction solution withdrawn in the withdrawing (A) into an aqueous phase and a water-insoluble organic solvent phase; and
   (C) after washing the water-insoluble organic solvent phase separated in the separating (B) with an acidic aqueous solution, separating the resultant into an aqueous phase and a water-insoluble organic solvent phase, wherein
the aqueous phase separated in the separating (C) is extracted with a water-insoluble organic solvent, a content of the polycarbonate-polyorganosiloxane copolymer in the obtained extract is controlled to not more than 2% by mass, and a part or the whole of the extract is reused for the withdrawing (A):

(1)

wherein
$R^1$ and $R^2$ are each independently a halogen atom, an alkyl group having from 1 to 6 carbon atoms, or an alkoxy group having from 1 to 6 carbon atoms;
X is a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, —S—, —SO—, —SO$_2$—, —O—, or —CO—; and
a and b are each independently an integer of from 0 to 4, (2)

wherein
$R^3$ to $R^6$ are each independently a hydrogen atom, a halogen atom, an alkyl group having from 1 to 6 carbon atoms, an alkoxy group having from 1 to 6 carbon atoms, or an aryl group having from 6 to 12 carbon atoms;

Y is a single bond, or an organic residue comprising an aliphatic or aromatic moiety; n is an average repeating number;

Z is a halogen atom, —R$^7$OH, —R$^7$—Z'—R$^8$—OH, —R$^7$COOH, —R$^7$NH$_2$, —COOH, or —SH;

R$^7$ is a substituted or unsubstituted alkylene group, a substituted or unsubstituted cycloalkylene group, or a substituted or unsubstituted arylene group;

R$^8$ is an arylene group having from 6 to 12 ring-forming carbon atoms;

Z' is an alkylene group having from 1 to 8 carbon atoms, an alkylidene group having from 2 to 8 carbon atoms, a cycloalkylene group having from 5 to 10 carbon atoms, or a cycloalkylidene group having from 5 to 10 carbon atoms; and m is 0 or 1.

2. The method according to claim 1, wherein in the separating (B), the separated water-insoluble organic solvent phase is further washed with an alkali aqueous solution and then separated into an aqueous phase and a water-insoluble organic solvent phase.

3. The method according to claim 1, wherein in the separating (C), the separated water-insoluble organic solvent phase is further washed with water and then separated into an aqueous phase and a water-insoluble organic solvent phase; the aqueous phase separated in the separating (C) is extracted with a water-insoluble organic solvent; the content of the polycarbonate-polyorganosiloxane copolymer in the obtained extract is controlled to not more than 2% by mass; and a part or the whole of the extract is reused for the withdrawing (A).

4. The method according to claim 1, wherein in the separating (C), a washing temperature is controlled to not higher than 37° C.

5. The method according to claim 1, wherein the withdrawing (A) comprises the following reacting (a-1) and withdrawing (a-2); a reaction mixed solution obtained in the reacting (a-1) is separated into an aqueous phase and a water-insoluble organic solvent phase; the obtained aqueous phase is mixed with the aqueous phase obtained by washing with an acidic aqueous solution and separating in the separating (C); the obtained aqueous phase is extracted with a water-insoluble organic solvent; the content of the polycarbonate-polyorganosiloxane copolymer in the obtained extract is controlled to not more than 2% by mass; and the extract is reused for the step (A):

(a-1): reacting a dihydric phenol compound of formula (1) and a carbonate precursor with each other in the presence of an alkaline compound aqueous solution and a water-insoluble organic solvent to produce a polycarbonate oligomer having a repeating unit of formula (I); and (a-2): withdrawing a polymerization reaction solution obtained by polymerizing the dihydric phenol compound, the polycarbonate oligomer obtained in the reacting (a-1), and a polyorganosiloxane of formula (2) in the presence of an alkaline compound aqueous solution and a water-insoluble organic solvent continuously or intermittently from a reactor:

wherein R$^1$, R$^2$, X, a, and b are as defined in claim 1.

* * * * *